(12) United States Patent
Brown et al.

(10) Patent No.: US 7,102,902 B1
(45) Date of Patent: Sep. 5, 2006

(54) DIMMER CIRCUIT FOR LED

(75) Inventors: Emery Alan Brown, Tujunga, CA (US); Pervaiz Lodhie, Rolling Hills, CA (US)

(73) Assignee: Ledtronics, Inc., Torrance, CA (US)

( * ) Notice: Subject to any disclaimer, the term of this patent is extended or adjusted under 35 U.S.C. 154(b) by 46 days.

(21) Appl. No.: 11/059,960

(22) Filed: Feb. 17, 2005

(51) Int. Cl.
*H02M 5/00* (2006.01)

(52) U.S. Cl. .......................... 363/89; 323/905

(58) Field of Classification Search .................. None
See application file for complete search history.

(56) References Cited

U.S. PATENT DOCUMENTS 5,629,607 A * 5/1997 Callahan et al. ............ 323/237
5,661,645 A * 8/1997 Hochstein ..................... 363/89

* cited by examiner

*Primary Examiner*—David Vu
(74) *Attorney, Agent, or Firm*—Irving Keschner

(57) ABSTRACT

The AC output from a source is rectified and applied to a resistor/Zener diode circuit connection which determines the magnitude of the rectified voltage applied via a circuit to a first MOSFET device. The inverted output of the first MOSFET device is applied to the gate electrode of a second MOSFET device in a manner such that the second MOSFET device is ON even when the AC output passes through zero. The output of the second MOSFET device is connected to a resistor which determines the magnitude of the load applied to the dimmer.

6 Claims, 2 Drawing Sheets

DIMMER CIRCUIT FOR LED

BACKGROUND OF THE INVENTION

1. Field of the Invention

The present invention provides a simplified and inexpensive circuit for dimming light emitting diodes utilizing a conventional TRIAC AC dimmer.

2. Background of the Invention

Circuits for dimming incandescent bulbs have been available in the prior art. For example, U.S. Pat. No. 6,566,819 to Wolff discloses a light control/dimmer system that can be touch operated and includes a programmable timer that controls the light attached thereto by switching the device to an "OFF" position after a predetermined time period. In most dimmers, the current will not go to zero unless there is a minimum load provided by the device being dimmed. Thus, the dimmer device typically has a minimum load placed on it of approximately 5 watts.

Light emitting diodes ("LEDs") that provide a specific, focused light output of a predetermined wavelength have been available for a number of years. U.S. Pat. No. 6,598,996 to Lodhie sets forth, inter alia, the advantages of using LEDs when compared to conventional incandescent bulbs. LEDs, in addition to replacing incandescent bulbs used in motor vehicles, have also been used for signage and other display systems. The illumination output from LEDs typically have a single intensity and are not easily adapted to having multiple levels of intensity and thus to dimming. Specifically, LEDs do not provide the minimum load necessary when used with conventional dimmers. Those LED circuits with dimmer devices draw higher power from the AC input source which, in turn, generates relatively higher heat levels which is undesirable in LED based circuits.

What is desired is to provide a circuit which enables LEDs to be dimmed and wherein the power/heat levels generated during LED use is substantially reduced.

SUMMARY OF THE INVENTION

The present invention provides a circuit that supplies a specialized load to a conventional AC dimmer which, in turn, controls a LED device. The circuit draws limited power from the energy source and also operates in a manner such that the heat generated by the circuit is substantially reduced.

In particular, the AC output from a source is rectified and applied to a resistor/Zener diode circuit connection which determines the magnitude of the rectified voltage applied via a circuit to a first MOSFET device. The inverted output of the first MOSFET device is applied to the gate electrode of a second MOSFET device in a manner such that the second MOSFET device is ON even when the AC output passes through zero. The output of the second MOSFET device is connected to a resistor which determines the magnitude of the load applied to the dimmer.

DESCRIPTION OF THE DRAWINGS

For a better understanding of the present invention as well as other objects and further features thereof, reference is made to the following description which is to be read in conjunction with the accompanying drawing wherein.

DESCRIPTION OF THE INVENTION

Figure 1:
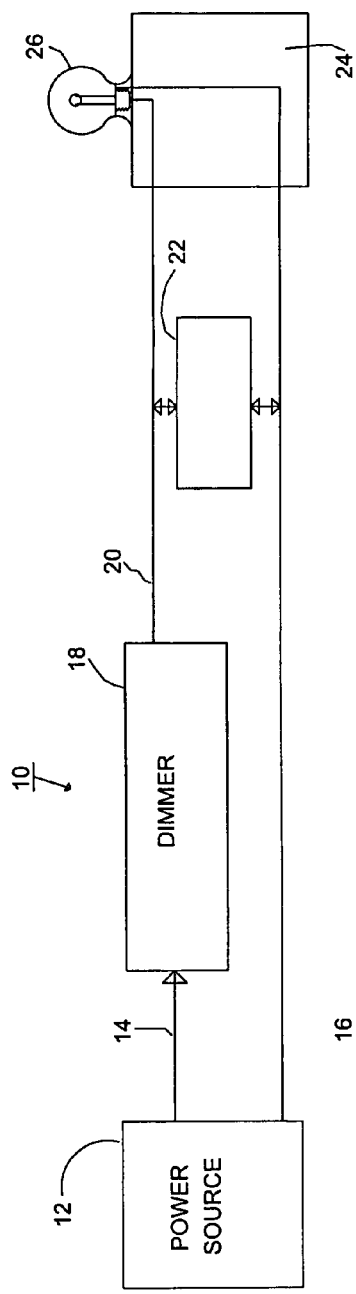
FIG. 1 is a block diagram of the dimmer system using the circuit of the present invention.

Referring to FIG. 1, a block diagram of the system 10 in which the circuit 22 of the present invention is utilized is illustrated.

The AC home power source 12 provides output leads 14 (the "hot" lead) and 16 ("neutral"), lead 14 being coupled to a conventional dimmer 18. The output lead 20 from dimmer 18, corresponding to hot lead 14 is coupled to a first input of circuit 22 of the present invention, neutral lead 16 being coupled to a second input of circuit 22. In the embodiment illustrated, the output of circuit 22 is coupled to Edison base socket 24 having a LED bulb 26 inserted therein. Although only a single LED bulb 26 is shown, a plurality of such LED bulbs can be placed in parallel across circuit 22. In an alternate arrangement, circuit 22 can be combined with an Edison base and the resulting combination then inserted into a conventional socket, thus eliminating the necessity of a separate wiring connection for circuit 22.

As will be set forth hereinafter in more detail, circuit 22 provides a technique for providing a varying load to the dimmer circuit 18 and absorbing leakage current therefrom, thus enabling the proper dimming of LED devices with conventional dimmers.

Conventional dimming works by controlling the amount of power furnished to the incandescent bulb; the greater the power applied to the bulb, the more intense the generated illumination; the lower the power applied to the bulb, the less intense the generated illumination. As shown in FIG. 3, this is accomplished by turning on the AC waveform generated by source 12 at different times during the waveform cycle. Specifically, waveform 37 illustrates the "full off" state (i.e. output power from the dimmer 18 is zero since the dimmer triac is not triggered), waveform 39 illustrates the triac turn-on times ("dim" status), waveform 40 illustrates the triac turn-on timer ("bright" status) and waveform 38 illustrates when the triac is continuously triggered ("turned-on" status). As noted hereinabove, incandescent bulbs provide a minimum load when used with conventional dimmers. Since LEDs consume so little power and actually will turn completely off as the waveform voltage goes lower, a proper dimmer load is not provided. The dimmer circuit 18 controls the waveform zero crossing time with a triac but without a load the triac is not completely turned off thereby not allowing the LEDs to be properly dimmed up or down. Without a load, the leakage current from the triac will cause the LEDs to glow even when dimmed or to flicker off without dimming. A reasonable solution would be to place a load resistor in parallel with the LEDs but it would draw 3–5 watts or more of power thereby generating 3–5 watts or more or useless heat. Using the above procedure to dim LED's is impractical since one of the virtues of using LEDs in an illumination circuit is that low heat levels are generated and low power levels are consumed. The circuit as described hereinafter with reference to FIG. 2 eliminates this problem by providing a mechanism of providing a load only when it is necessary during the input AC waveform so the triac dimmer will function properly although the total power used, and therefore the total heat generated, is minimized thereby maintaining significantly lower circuit power levels.

Figure 2:
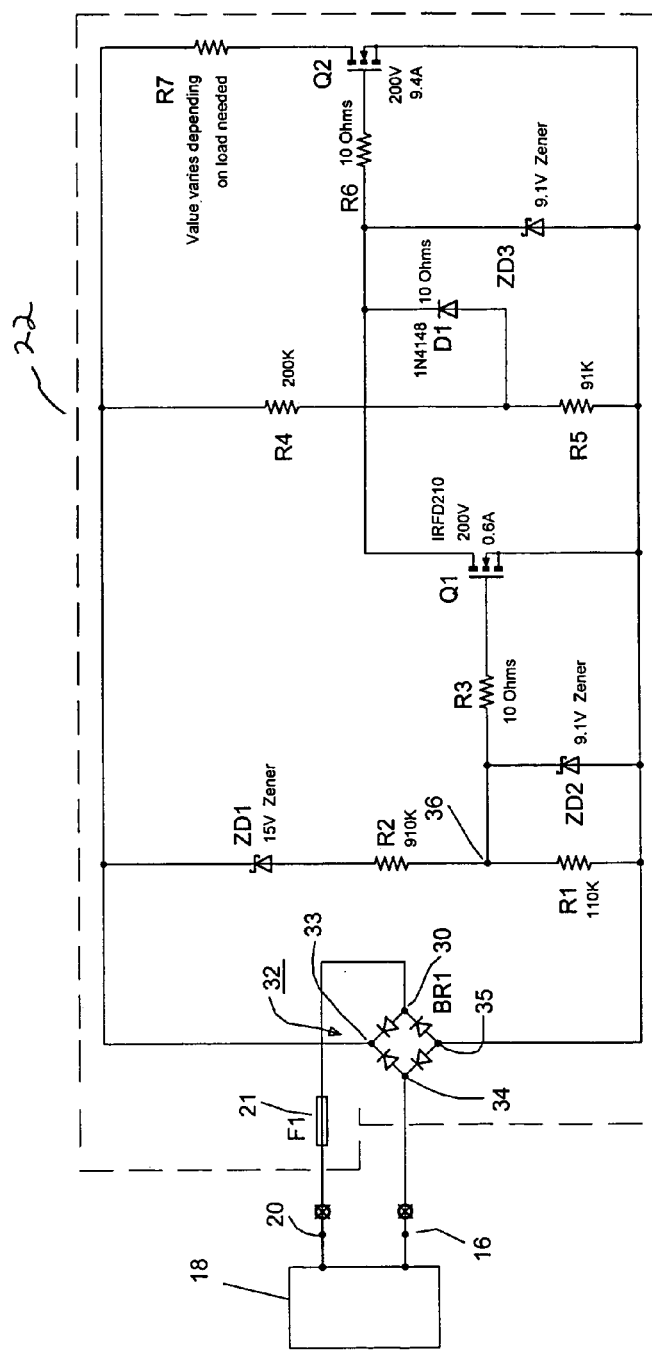
FIG. 2 illustrates the dimming circuit of the present invention.
Figure 3:
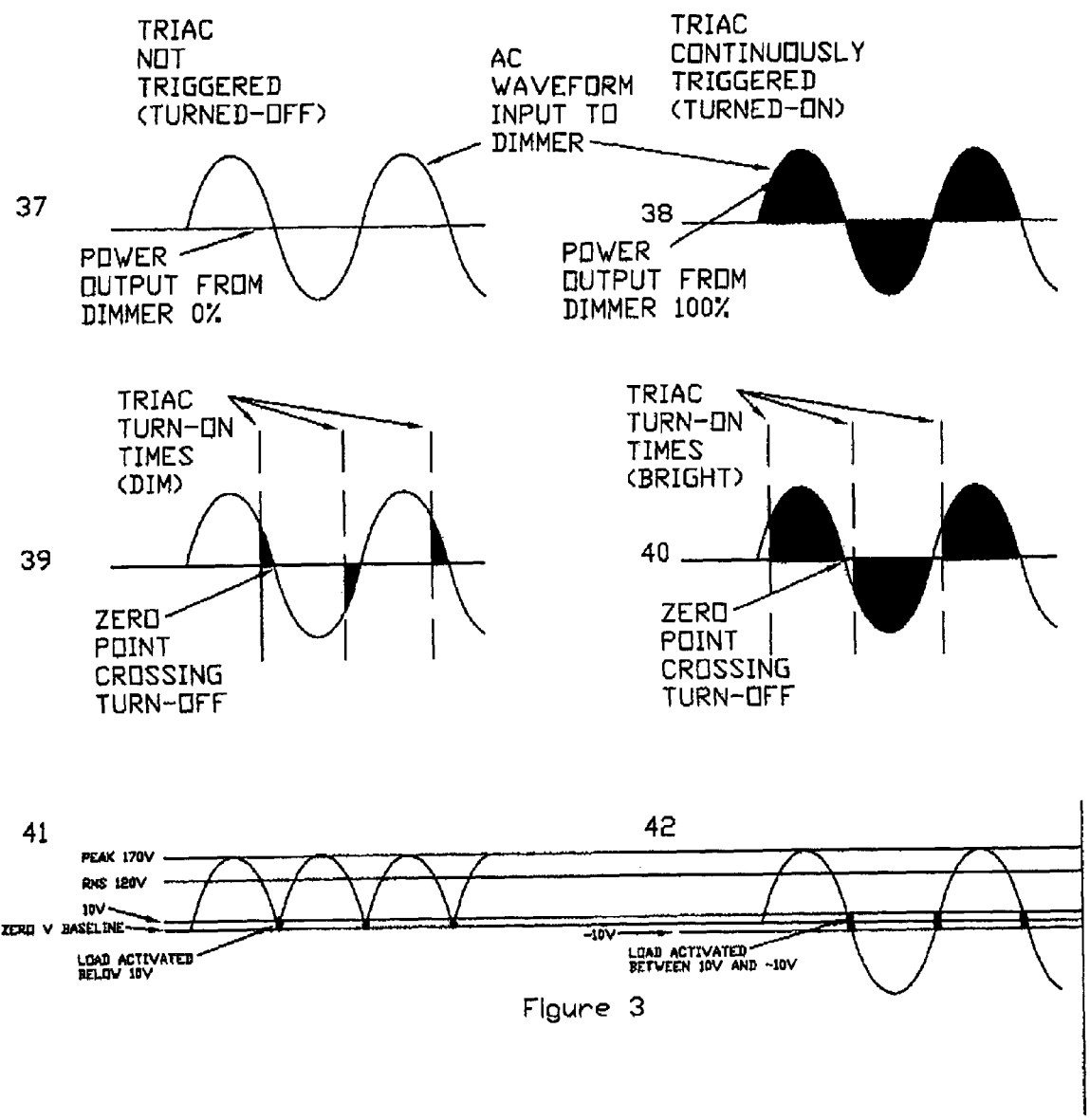
FIG. 3 illustrates how the AC input waveform is acted upon by the dimming system of the present invention.

Referring now to FIG. 2, the hot terminal 20 output from dimmer 18 is coupled to node 30 of full wave bridge rectifier 32 via fuse F1 and neutral lead 16 is coupled to node 34 of rectifier 32. The positive output 33 from rectifier 32 is coupled to the cathode of Zener diode ZD1 and a first terminal of resistor R4. The anode of Zener diode ZD1 is connected to one terminal of resistor R2, the other terminal of resistor R2 being connected to one terminal of resistor R1. The connection node 36 between resistors R1 and R2 is connected to the cathode of Zener diode ZD2 and to one terminal of resistor R3, the other terminal of resistor R3 being connected to the gate electrode of MOSFET Q1. The drain electrode of MOSFET Q1 is coupled to the cathode of signal diode D1 and Zener diode ZD3 and one terminal of resistor R6. The anode of diode D1 is connected to node 33 of rectifier 32 via resistor R4. The anode of diode D1 is also connected to a first terminal of resistor R5. The anode of Zener diode ZD3 is connected to the source electrode of MOSFET Q2, a second terminal of resistor R5, the source terminal of MOSFET Q1, the anode of Zener diode ZD2 and a second terminal of resistor of R1 which are directly coupled to node 35. The other terminal of resistor R6 is connected to the gate electrode of MOSFET Q2. The drain electrode of MOSFET Q2 is coupled to node 33 of rectifier 32 drain via resistor R7.

Typical values of the components shown in FIG. 2 are as follows:

D1—15V, 1.5 W
R2—910 Kohms, 1/4 W
R1—110 Kohms, 1/4 W
ZD2—9.1V, 1 W
R3—10 ohms, 1/4 W
Q1—IRFD210 (200V, 0.6 A)
R4—200 Kohms, 1/4 W
R5—91 Kohms, 1/4 W
D1—IN4148
ZD3—IN 4148
R6—10 ohms, 1/4 W
Q2—IRFR9N20N (200V, 9.4 A)
R7—3.0 Kohms, 1/2 W (the value of resistor R7, in accordance with the teachings of the invention, is adjustable and depends on the required dimmer load and can vary up to 9 Kohms and 1 W).

All the above components are available from Digi-Key Corporation, Thief River Falls, Minn.

In operation, energy source 12 provides a live, or hot, AC output on leads 20 and a ground voltage on neutral leads 16.

The AC output is coupled to full wave rectifier bridge circuit 32, the output of circuit 32 at terminals 33 and 35 being a series of full wave rectified sine waves of a single (positive) polarity (waveform 41, FIG. 3). The output of circuit 32 is applied across Zener diode ZD1 and resistors R1 and R2 and functions to provide a window such that when the voltage thereacross goes above a predetermined magnitude such as 10 volts, Zener diode ZD2 and resistor R3 cooperate to turn on MOSFET Q1. Q1 inverts the input thereto and the inverted output is applied to the input of MOSFET Q2 to apply a bias thereto and, as a result, turn on Q2. Resistor R6 enables a sufficient amount of residual charge to be applied to the gate electrode of Q2 to keep Q2 on even though the input power drops to zero. Thus, Q2 is maintained on when the input AC voltage is in the range between −10V to +10V (waveform 42, FIG. 3) and applies a load via resistor R7 across bridge rectifier 32 which, in turn, applies a load across lines 16 and 20. When the voltage is greater than 10 volts and regardless of polarity, the load is put into a high impedance state thereby removing the load.

In effect, the required dimmer load is provided to the dimmer at the needed time and removed when it would have no effect except for drawing power, thereby creating the proper dimmer load but only allowing a very low wattage to be added to the dimming circuit.

It should be noted that the circuit described in FIG. 2 can be used in a system having both LED and incandescent bulbs. Even though the incandescent bulbs provide a load, the LEDs will respond to the circuit as described hereinabove, and dim better than using the incandescent bulbs for a load. The incandescent bulbs used with this circuit will work as normal, in effect not responding to the circuit.

In summary, the load for resistor R7 is coupled to the dimmer circuit 18 by being shorted across the dimmer output. When the MOSFET Q2 conducts it becomes, in essence, a piece of wire. When MOSFET Q2 conducts it therefore puts the load resistor R7 directly across the output of the dimmer. The rectifier does not interfere with the action of the load resistor R7 but since the MOSFET Q2 is used to turn a polarized signal off and on, the rectifier is necessary to assure that only a positive going power signal is flowing through the MOSFET Q2 and the load resistor R7. The dimmer circuit 18 output only sees the equivalent of a simple load resistor across it.

As noted hereinabove, an AC dimmer device requires a load to operate properly and most such dimmers operate using a triac. Although a triac is an inexpensive component that works well for AC dimming, it causes problems when used with LEDs.

First, there is a current leakage through the triac even when the triac is in the off mode. This causes the leakage current to light up an LED even when such small leakage current would not light an incandescent bulb.

In addition, the triac is triggered by its dimmer circuitry, and once triggered, the triac continues to conduct until the current through it stops. This does not work with DC circuits (used with LED circuits) because the current never stops but on an AC circuit the current goes to zero every time the power goes to zero (120 times a second on a standard 60 Hz power line). However, most dimmers require a minimum load to draw power out of the dimmer circuit to enable the triac to turn off properly so that the incandescent bulb would be illuminated at the right time. The dimmer does not operate properly without a load and the circuit of the present invention supplies a load at the right time without the waste of power which would occur using a power load resistor.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A cicuit adapted for use with a dimmer wherein a predetermined variable electrical load is made available to said dimmer, an AC source applying power to said circuit comprising:

means for coupling the output of said AC dimmer to a rectifier;

a first Zener diode having an anode and first and second resistors connected in series, said series connected components being in turn connected in parallel with said rectifier;

a second Zener diode having an anode and cathode, said second Zener diode connected in parallel with second resistor, the cathode of said second Zener diode being connected to the node between the first and second resistors;

a third resistor connected between said second Zener diode cathode and the gate electrode of a first MOSFET device, the drain electrode of said first MOSFET device being coupled to the cathode of a first diode, a third Zener diode and the sixth resistor;

a fourth and fifth resistor connected in series, said series connection in turn connected in parallel with said rectifier; the anode of said first Zener diode being connected to the junction of said fourth and fifth resistor; and a sixth resistor connected to the base electrode of a second MOSFET device having a drain electrode, the drain electrode of said second MOSFET device being connected to the cathode of said first Zener diode via a seventh resistor, said seventh resistor and second MOSFET cooperating to apply said electrical load to said dimmer.

2. The circuit of claim 1 wherein said second MOSFET device is activated during the time period when the power applied to said circuit by said AC source is substantially between +10 volts and zero volts and between −10 volts and zero volts.

3. The circuit of claim 2 wherein the value of said seventh resistor is determined by the dimmer load required during the time period when power is applied to the circuit by said AC source.

4. The circuit of claim 3 wherein the output of said dimmer is coupled to an LED illumination device.

5. A dimmer system for controlling the illumination output form an LED device comprising:

means for generating an AC waveform;

a dimmer circuit coupled to said generating means and having an output;

rectifier means coupled to the output of said dimmer circuit;

means for controlling the value of a load applied to said dimmer circuit; and a load coupled to said controlling means, said load being coupled to said dimmer circuit, said dimmer circuit being coupled to said LED device.

6. The system of claim 5 wherein the value of said load is adjusted during predetermined time periods of said AC waveform.

* * * * *